United States Patent Office 2,837,501
Patented June 3, 1958

2,837,501

TERPOLYMERS INCLUDING VINYLARENESULFONIC ACIDS AND ACRYLONITRILE

Frederick Roy Millhiser, Waynesboro, Va., assignor to E. I. du Pont de Nemours and Company, Wilmington, Del., a corporation of Delaware No Drawing. Application August 3, 1953
Serial No. 372,183

15 Claims. (Cl. 260—79.3)

This invention relates to new polymers of acrylonitrile. More specifically, this invention relates to acrylonitrile polymers containing sites for basic dyes and to polymeric compositions that promote availability of these dye sites without substantially inhibiting dyeability with acid and dispersed acetate type dyes.

Yarns from acrylonitrile homopolymers have poor affinity for dyes, but they can be dyed with difficulty using basic, acid and dispersed acetate type dyes. However, such dyeings are not entirely satisfactory, and many modifications of the polymer have been proposed to improve dyeability. Basified acrylonitrile polymers, for instance, acrylonitrile copolymers containing from 2 to 10% of a vinyl pyridine, have improved affinity for acid dyes, but such modification affects other properties including the dyeability with basic dyes so that these basified copolymers are of limited utility.

For well rounded commercial utility it is desirable to be able to color polyacrylonitrile yarns, fabrics and other articles with dyes that exhibit good wash and light fastness and that can be applied in the presence of other fibers to create cross and union dyeing effects. Yarns from acrylonitrile copolymers containing a small proportion of methyl acrylate have improved dye receptivity (depth), improved light fastness (especially with dispersed dyes) and improved dyeing uniformity compared to homopolymer yarns. These copolymer yarns can be dyed with acid (cuprous-ion techniques), basic and dispersed dyes to yield generally satisfactory articles except that insufficient basic dye adsorption is obtained to yield the desirable deep shades. Deep dyeing with basic dyes is desirable in order to facilitate cross and union dyeing of polyacrylonitrile yarns with wool (using acid dyes on wool) and with rayon (using direct dyes on the rayon).

The affinity of acrylonitrile polymer yarns and fabrics for dyes in general decreases as the yarn in the course of manufacture is subjected to greater drawing, although a high draw ratio is desirable to provide a high degree of molecular orientation and high tenacity and other desired physical properties. The more highly drawn the yarn, the more dense and the less penetrable it becomes. It follows that incorporation of sites for basic dyes in the polymer does not necessarily provide adequate dyeability, because many of the sites provided may become inaccessible to the dye molecules.

It is, therefore, an object of this invention to provide new acrylonitrile copolymers. Another object of this invention is to provide acrylonitrile polymer structures with available sites for basic dyes. Still another object of this invention is to provide an acrylonitrile polymer structure which has excellent affinity for basic dyes and which, at the same time, retains very satisfactory dyeability with dispersed acetate type dyes and with acid dyes. Other objects will be apparent from the description that follows.

The objects of this invention are accomplished by polymerizing acrylonitrile and another vinyl monomer with a sulfoarylethylene or a water-soluble salt thereof such as the potassium salt. Generally, only a small proportion of the sulfoarylethylene monomer need be introduced into the polymer, that is, from 1 to 3%, although larger amounts, up to 8 or 10%, may at times be advantageous. In some cases as little as 0.5% may be adequate depending on the chemical composition of the polymer and the processing involved in converting the polymer into the finished product. Water-soluble salts of vinylbenzenesulfonic acid are ideally suited for polymerizing with acrylonitrile to give structures having improved affinity for basic dyes because the ionizable salt dye sites established can react with the dye molecules. The availability of dye sites is further improved by copolymerizing with the third monomer such as methyl methacrylate, methyl acrylate, vinyl acetate, methyl vinyl ketone, N-t-butyl-acrylamide or other vinyl monomers. That is, the terpolymers of this invention have better dyeability than the corresponding acrylonitrile/vinylbenzensulfonate copolymers. The polymers of this invention displays extraordinary basic dye affinity without substantial loss in affinity for acid or dispersed acetate type dyes. In copolymers involving 3 or more components wherein acrylonitrile comprises at least 85% and the neutral component about 2 to 12%, the sulfoarylethylene content preferably ranges from about 0.5 to 5%.

The following examples are given for illustrative purposes and are not limitative. Parts and percentages are by weight unless otherwise indicated.

EXAMPLE I

One thousand parts of beta-phenylethyl bromide was added dropwise over 1 hour with stirring at 20° C. to chlorosulfonic acid (2000 parts). After stirring for 1 hour more at the same temperature, the solution was poured into ice and the solid precipitate washed twice with ice water (3000 parts each time). The residue was suspended in water (1000 parts) and heated with stirring on a steam bath while a concentrated aqueous solution of potassium carbonate was added, the pH being at 7 or lower. When the pH began to rise to about 7-8, the solution was filtered and cooled to 0° C. The solid which separated was filtered. The filtrate was evaporated to dryness under reduced pressure, and the residue and that from the filtrate were combined and dried under vacuum. The potassium beta-bromoethylbenzenesulfonate so obtained was characterized by elemental analysis and by analysis of its S-benzylisothiouronium salt, M. P. 149-150° C. The dried salt was finely powdered and heated under reflux with stirring for 1 hour in a solution of potassium hydroxide (300 parts) in methanol (2500 parts). Carbon dioxide was added to pH of 8 and the mixture filtered hot. The residue was further extracted with boiling methanol and the total extract was cooled to −20° C. and filtered to give 415.5 parts of product. Concentration of the mother liquor gave a further 194.0 parts making 609.5 parts in all, being 50.5% of the theoretical yield. By bromine addition successive products analyzed as 75-80% pure. The potassium vinylbenzenesulfonate was characterized by elemental analysis of its S-benzylisothiouronium salt, M. P. 143-144° C.

| Analysis | C | H | N | S |
|---|---|---|---|---|
| Potassium beta-bromoethyl-benzenesulfonate (PBBS): | | | | |
| Found | 31.5 | 2.6 | | 10.6 |
| Requires | 31.7 | 2.6 | | 10.6 |
| S-benzylisothiouronium salt of PBBS: | | | | |
| Found | 45.0 | 4.4 | 6.6 | |
| Requires | 44.6 | 4.4 | 6.5 | |
| S-benzylisothiouronium salt of vinylbenzenesulfonic acid: | | | | |
| Found | 54.95 | 5.0 | 8.0 | 18.3 |
| Requires | 54.9 | 5.0 | 8.0 | 18.3 |

Fractionation of the crude salt using alcohol gave the three fractions: a more soluble fraction, a less soluble fraction and an intermediate fraction. Infrared examination of the mixture indicated the presence of 60-75% of the para isomer and 40-25% of the ortho. These isomers may be separated, or they may be used together as prepared.

To a continuous polymerizing vessel of such capacity to provide a hold-up time of 60 minutes under the feed conditions set forth below, a catalyst solution consisting of 0.05% sulfuric acid, 1.07% potassium perdisulfate and the balance water and an activator solution consisting of 0.54% sodium metabisulfite, 0.5% potassium vinylbenzenesulfonate (PVS) and the rest water were fed at the rate of 11.6 parts per minute each and a mixture of acrylonitrile (AN) and methyl acrylate (MA) consisting of 95.1% acrylonitrile and 4.9% methyl acrylate was fed at the same time at the rate of 5.67 parts per min. to make the total monomer concentration about 20% of the feed liquors. The jacketed reactor was maintained at 45° C. and the polymer slurry which emerged from the overflow nozzle was at pH 3.3. The polymer was washed free of catalyst, activator, and unreacted monomer with water and then dried. The resulting terpolymer was of 1.59 intrinsic viscosity; 80% conversion had resulted.

The polymer, analyzed by infrared absorption at 5.8 microns for carbonyl absorption and at 9.6 microns for sulfonate absorption, was 94.1/5.0/0.9, AN/MA/PVS respectively to agree well with the weighed amount of 94/5.0/1.0 in the feed stream.

A number of polymers made under the above conditions except for variations in the catalyst and activator feed concentration (based on the combined weight of monomers) as indicated below are listed in the following table:

*Table I*

AN/MA/PVS Polymers

| Monomer feed composition | Percent $K_2S_2O_8$ | Percent $Na_2S_2O_5$ | Int. visc. | Conversion, percent |
|---|---|---|---|---|
| 94/5.8/0.2 | .88 | 1.48 | 1.77 | 74 |
| 94/5.6/0.4 | .88 | 1.48 | 1.95 | 70 |
| 94/5.6/0.4 | 1.85 | 0.93 | 1.66 | 81 |
| 94/5.3/0.7 | 1.04 | 1.75 | 1.88 | 70 |
| 94/5.0/1.0 | 2.20 | 1.10 | 1.59 | 80 |
| 94/4.4/1.6 | 2.20 | 1.10 | 1.67 | 80 |
| 94/3.5/2.5 | 2.35 | 1.17 | 1.72 | 81 |
| 94/2.0/4.0 | 2.35 | 1.17 | 1.94 | 83 |
| 96.8/1.6/1.6 | 2.20 | 1.10 | 1.57 | 80 |
| 94/4.4/1.6 | 1.10 | 2.20 | 1.58 | 77 |

AN/PVS Polymers

| | | | | |
|---|---|---|---|---|
| 98.6/1.4 | 2.50 | 1.25 | 1.43 | 81 |
| 98/2 | 2.20 | 1.10 | 1.75 | 80 |
| 96/4 | 2.20 | 1.10 | 1.69 | 86 |
| 94/6 | 2.20 | 1.10 | 1.76 | 92 |

An inverse ratio of catalyst to activator is also usable. The desired molecular weight can be obtained by increasing the catalyst and activator to lower the molecular weight or decreasing the amounts to increase the molecular weight.

EXAMPLE II

Terpolymers with other monomers besides methyl acrylate can be readily made in a similar fashion. The table below illustrates this.

*Table II*

| | Monomer feed ratio |
|---|---|
| Terpolymers—AN/X/PVS | 94/5/1 |

Percent $K_2S_2O_8$—2.20% (on combined wt. of monomers)
Percent $Na_2S_2O_5$—1.10% (on combined wt. of monomers)

| X (monomer) | Int. visc. | Conversion percent |
|---|---|---|
| Methyl methacrylate (MM) | 1.60 | 80 |
| Methyl vinyl ketone (MVK) | 1.65 | 78 |
| Vinyl acetate (VA) | 1.55 | 82 |
| N-t-butylacrylamide (N-t-BA) | 1.60 | 80 |

All of the foregoing polymers may be converted to fibers by dissolving them in N,N-dimethylformamide (DMF) or any such solvent for polymers high in acrylonitrile and spinning by evaporation of the solvent. The resulting spun fibers may be washed in hot or cold water to remove residual solvent, drawn 2 to 10 times their original length and relaxed as desired in the neighborhood of 10 to 20%. This may be done on filament yarn equipment using steam under pressure or, alternatively, the fibers may be washed and drawn simultaneously in hot water.

Similar polymers were prepared using the sodium salt of vinylbenzenesulfonic acid.

EXAMPLE III

Dyes containing a cationic site may be readily applied to very deep shades onto fibers made from the sulfonate-containing polymers. The amount of dye on a fiber or the depth of color are approximately proportional to the K/S value which is a measure of the light reflected from a sample. The larger the K/S value, the deeper the shade and a K/S of 20 is approximately twice as deep as a K/S of 10. Values around 30 are rather deep shades with values of 100 being almost the color of the concentrated dyestuff.

Table III gives the K/S values for the PVS co- and ter-polymers dyed for three hours at the boil with excess basic dyestuff, dispersed dyestuff, or acid dyes (cuprous-ion technique). The terpolymers have an advantage over the copolymers in the following ways: (1) deeper dyeing with basic dyes at less PVS content, and (2) deep shades obtainable with dispersed and acid dyes which are not dependent upon PVS content as with the copolymer.

Thus, dye sites alone are not adequate to give deep-dyeing and the mere introduction of sulfonates into a polymer of acrylonitrile will not give deep shades unless those sites are available to the dyestuff. It is in this connection that the third component, methyl acrylate and other compounds copolymerizable with acrylonitrile make available those sites to the dye molecules to get the deep shades desired for textile fibers.

*Table III.—Maximum dyeability in 3-hour dyeings*

| Composition of fiber | Draw ratio | K/S values | | |
|---|---|---|---|---|
| | | Green basic dye—Color index 662 | Blue dispersed dye, prototype 62 | Blue acid dye bath, prototype 12 |
| Polyacrylonitrile | 8X | 0.70 | 1.5 | 6.88 |
| AN/MA/94/6 | 8X | 6.47 | 22.03 | 31.30 |
| AN/MA/PVS 94/5.4/0.6 | 8X | 8.74 | 19.31 | 28.47 |
| AN/MA/PVS 94/5.0/1.0 | 8X | 22.01 | 23.74 | 30.78 |
| AN/MA/PVS 94/4.4/1.6 | 8X | 36.09 | 27.29 | 30.26 |
| AN/MA/PVS 94/3.5/2.5 | 8X | 60.14 | 29.90 | 30.08 |
| AN/MA/PVS 94/2.0/4.0 | 8X | 86.55 | 30.00 | 30.50 |
| AN/PVS 98/2 | 8X | 12.54 | 8.91 | 25.47 |
| AN/PVS 96/4 | 8X | 49.51 | 15.09 | 31.37 |
| AN/PVS 94/6 | 8X | 70.43 | 16.44 | 31.30 |
| Polyacrylonitrile | 5X | 12.45 | 10.75 | 28.55 |
| AN/MA 94/6 | 5X | 20.79 | 36.18 | 30.78 |
| AN/MA/PVS 94/5.4/0.6 | 5X | 32.34 | 33.01 | 29.80 |
| AN/MA/PVS 94/5.0/1.0 | 5X | 63.74 | 34.81 | 30.78 |
| AN/MA/PVS 94/4.4/1.6 | 5X | 94.84 | 31.82 | 30.78 |
| AN/PVS 98/2 | 5X | 61.50 | 18.44 | 30.26 |
| AN/PVS 96/4 | 5X | 94.84 | 26.10 | 30.80 |
| AN/PVS 94/6 | 5X | 124.00 | 29.86 | 28.42 |
| AN/MM/PVS 94/5/1 | 5X | 56.42 | 32.07 | 30.36 |
| AN/MVK/PVS 94/5/1 | 5X | 60.04 | 33.91 | 30.56 |
| AN/VA/PVS 94/5/1 | 5X | 50.06 | 32.08 | 30.20 |
| AN/N-t-BA/PVS 94/5/1 | 5X | 48.34 | 32.04 | 30.30 |

The dye baths used above had 200 parts of water to 1 part of fiber and were used at the boil. The time of treatment in each case was 3 hours. The green basic dye bath had 10% dye based on the fiber; the blue dispersed dye bath had 2% dye based on the fiber; and the blue acid dye bath contained 16% $CuSO_4 \cdot 5H_2O$, 5% hydroxylamine sulfate and the amount of the dye was 16%, based on the weight of the fiber.

From the above results it can be seen that much more PVS must be used in a two-component polymer than in a terpolymer to get deep dyeing. Further, lower draw ratio helps the dyes to penetrate to the dye sites. Deeper dyeing is obtained with basic dyes without sacrifice of dyeability with other dyes. A difference of 10% in K/S is easily seen as a shade difference; a K/S of 10 is ⅕ as deep as K/S of 50.

Similar polymers and results are obtained using the ammonium salt of the vinylbenzenesulfonic acid or amine salts thereof.

EXAMPLE IV

The hot-wet modulus is an indication of how fibers will act in the dye bath under conditions of tension which are normally used in the dyeing of fabrics, for example on the jig. A very low modulus means that the fiber will stretch out of shape and also form wrinkles during the dyeing operation and is, therefore, undesirable. In this connection, the terpolymers have an advantage over the two-component polymers since the hot-wet modulus falls off with PVS content in the latter. Table IV shows the advantages of using the terpolymer in the place of the AN/PVS polymer. Less amounts of PVS in the terpolymer are required to give the deep shades desirable with all classes of dyes, especially basic dyestuffs. This is especially true in filament yarn drawn 8 times the original length.

*Table IV.—Hot (90° C.) wet moduli on PVS filament yarns*

(8× DRAWN YARNS)

| Monomers | Composition | Denier | Ten., g. p. d. | Elong., percent | Modulus, g. p. d. |
|---|---|---|---|---|---|
| AN/MA | 94/6, control | 1.83 | 2.65 | 20 | 12.7 |
| AN/MA/PVS | 94/5.6/0.4 | 2.02 | 2.83 | 21 | 13.4 |
| AN/MA/PVS | 94/5/1 | 1.81 | 2.88 | 26 | 11.8 |
| AN/MA/PVS | 94/4.4/1.6 | 1.75 | 2.20 | 22 | 9.8 |
| AN/PVS | 98/2 | 1.97 | 2.85 | 43 | 8.7 |
| AN/PVS | 96/4 | 1.74 | 1.46 | 36 | 5.5 |
| AN/PVS | 94/6 | 2.60 | 1.62 | 50 | 5.2 |

(5× DRAWN YARNS)

| Monomers | Composition | Denier | Ten., g. p. d. | Elong., percent | Modulus, g. p. d. |
|---|---|---|---|---|---|
| AN/MA | 94/6, control | 2.67 | 1.56 | 65 | 2.8 |
| AN/MA/PVS | 94/5.6/0.4 | 3.40 | 1.54 | 82 | 2.3 |
| AN/MA/PVS | 94/5/1 | 3.44 | 1.32 | 89 | 2.2 |
| AN/MA/PVS | 94/4.4/1.6 | 2.67 | 1.1 | | 3.1 |
| AN/PVS | 98/2 | 3.31 | 1.09 | 140 | 1.7 |
| AN/PVS | 96/4 | 3.48 | .39 | High | 1.3 |
| AN/PVS | 94/6 | 3.83 | .88 | 114 | 1.5 |

The physical properties are good for terpolymers and in some ways are better than for the two-component AN/MA copolymers. For example, in stable, higher tenacities and elongations are observed at the same draw ratio of 4× under dry conditions. This advantage is lost, however, upon wetting. The abrasion resistance is much better on the PVS-containing polymer and it is a function of the PVS content. Table V shows this important effect.

*Table V.—Physical properties of staple fibers containing PVS*

(4× draw, 2–3 denier)

| Monomers | AN/MA | AN/MA/PVS | AN/MA/PVS |
|---|---|---|---|
| Composition | 94/6, control | 94/5.6/0.4 | 94/5/1 |
| Physicals:[1] | | | |
| Dry: | | | |
| T/E | 2.53/22.9 | 3.31/15.9 | 3.47/15.3 |
| Modulus (initial) | 47.4 | | |
| Wet: T/E | 2.48/24.8 | 2.39/30.9 | 1.70/27.7 |
| Abrasions (cycles to break on 90/40 count) | 274 | 530 | 730 |
| Shrinkage, percent | 20.5 | 19.1 | 16.1 |

[1] T=tensile strength in grams per denier. E=percent elongation at break.

The sulfoarylethylene acid that is used may have the sulfonic acid group in either the ortho, para or meta position in respect to the vinyl group. The method given above for the preparation of benzenesulfonic acid is conveniently used but other methods, as for example, the oxidation of mercaptan groups on an aryl ring, may be employed. Similarly, the aromatic nucleus may be chosen from a variety. For example, the aromatic nucleus may be substituted with other groups in addition to the sulfonic acid groups. For example, there may be alkyl, alkoxy and similar groups on the nucleus. Specific examples which may be used include 2-methyl-4-vinyl-, 3-methyl-4-vinyl-, 2-methyl-5-vinyl-, 3,5-dimethyl-6-vinyl-, 2,5-dimethyl-4-vinyl-, 2,5-dimethyl-6-vinyl-, 2,3-dimethyl-6-vinyl-, 3,4-dimethyl-6-vinyl-, 2,4-dimethyl-6-vinyl-, 2,3,5-trimethyl-6-vinyl-, 2-ethyl-4-vinyl-, 3-ethyl-4-vinyl-, 3-ethyl-5-vinyl-, 2,4-diethyl-6-vinyl-, 2,5-diethyl-4-vinyl-, 2,5-diethyl-6-vinyl-, 2-isopropyl-4-vinyl-, 2-isopropyl-6-vinyl-, 3-isopropyl-6-vinyl-, 3-t-butyl-6-vinyl-, 3-sec-butyl-6-vinyl-, and 3-cyclohexyl-6-vinylbenzenesulfonic acids.

While the invention has been described largely in terms of terpolymers of acrylonitrile, methyl acrylate and potassium vinylbenzenesulfonate, other three- or more component polymers may be used to advantage. Any water soluble salt of the vinylarylsulfonic acid or the acid itself may be used so long as it provides an ionizable dye site. For instance the sodium, lithium, ammonium or amine salts such as the triethanolamine salt, and other monovalent salts may be used.

In addition to the neutral comonomers previously mentioned any of a large number of polymerizable neutral monomers previously copolymerized with acrylonitrile such as disclosed in Jacobson U. S. 2,436,926 may be used. These include methyl methacrylate, methacrylamide, acrylic acid, methacrylonitrile, acrylyl chloride, butadine, chloroprene, vinyl chloride, vinylidene chloride, methyl vinyl ketone, divinylbenzene, methylene bisacrylamide and vinylidene cyanide. Any neutral ethylenically unsaturated compound containing a terminal double bond and being copolymerizable with acrylonitrile and the sulfoarylethylene may be used. While the polymers of this invention may be used in non-textile arts, as, for example, soil conditioners, the main application is fibers. For this use polymers having a major portion of acrylonitrile are preferred. Those having 70% or more of acrylonitrile are generally used. For best strength, insolubility and sunlight resistance, polymers of 85% or more acrylonitrile are usually employed.

Not only are the yarns and fibers greatly improved in dyeability, but because of the small amount of vinylbenzene-sulfonate in the polymer, excellent physical properties are maintained. The unexpected and exceptional improvement in abrasion resistance opens up new fields of use where wear conditions were too severe for the acrylonitrile homopolymers and copolymers previously available.

Any departure from the above description which conforms to the present invention is intended to be included within the scope of the claims.

I claim:

1. A composition of matter comprising a terpolymer of (1) acrylonitrile in a predominant amount, (2) a compound selected from the class consisting of vinylarenesulfonic acids and their water-soluble salts in minor amount and (3) a different ethylenically unsaturated monomer in intermediate amount copolymerizable therewith.

2. The composition of claim 1 in which the said compound is vinylbenzenesulfonic acid.

3. The composition of claim 1 in which the said compound is a salt of a vinylarenesulfonic acid.

4. The composition of claim 3 in which the said salt is an alkali metal salt.

5. The composition of claim 3 in which the said salt is an amine salt.

6. The composition of claim 3 in which the said salt is ammonium salt.

7. The composition of claim 1 in which the said different ethylenically unsaturated monomer is a vinyl ester.

8. The composition of claim 1 in which the said different ethylenically unsaturated monomer is methyl acrylate.

9. The composition of claim 1 in which the polymer is a terpolymer and has an acrylonitrile content of at least 85% by weight.

10. The composition of claim 1 in which the said different ethylenically unsaturated monomer is a neutral vinyl ester present in the amount of from about 2.0% to 12% by weight.

11. The composition of claim 1 in which the said compound is present in the amount of from about 0.2% to 10% by weight.

12. The composition of claim 1 which contains at least 85% acrylonitrile, from about 2% to 12% of methyl acrylate and from about 0.2% to 10% of an alkali metal styrene sulfonate.

13. As a new composition of matter, a copolymerizable mixture of (1) acrylonitrile, (2) a compound selected from the class consisting of vinylarenesulfonic acids and their water-soluble salts and (3) a different ethylenically unsaturated monomer copolymerizable therewith.

14. The composition of claim 1 in the form of a filament.

15. The composition of claim 1 in the form of a film.

References Cited in the file of this patent

UNITED STATES PATENTS

| | | |
|---|---|---|
| 2,500,025 | Dickey et al. | Mar. 7, 1950 |
| 2,520,917 | Dickey et al. | Sept. 5, 1950 |
| 2,527,300 | Dudley | Oct. 24, 1950 |
| 2,588,968 | Dickey et al. | Mar. 11, 1952 |
| 2,601,256 | Bruson | June 24, 1952 |
| 2,616,917 | Coover et al. | Nov. 4, 1952 |
| 2,709,163 | Couper et al. | May 24, 1955 |
| 2,759,816 | Minsk | Aug. 21, 1956 |
| 2,760,955 | Park et al. | Aug. 28, 1956 |
| 2,773,856 | Meyer et al. | Dec. 11, 1956 |

FOREIGN PATENTS

| | | |
|---|---|---|
| 1,106,816 | France | July 27, 1955 |

OTHER REFERENCES

Moralli: Bull. Soc. Chem. France 1953, 11044–11045. Abstract in C. A. 49, 2347 (1955).

Campaigne et al.: J. Am. Chem. Soc. 68, 880–882 (May 1946).